C. E. LIPE.
FLUID-METERS.
No. 194,523. Patented Aug. 28, 1877.
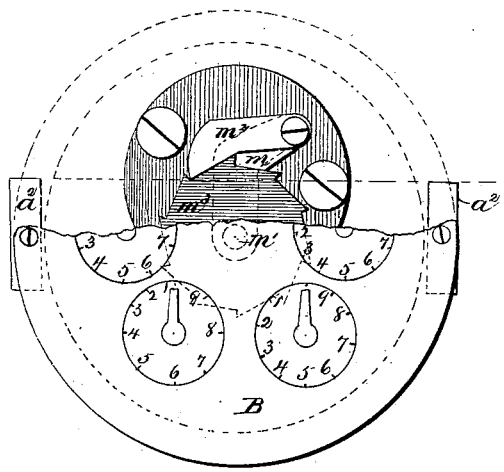
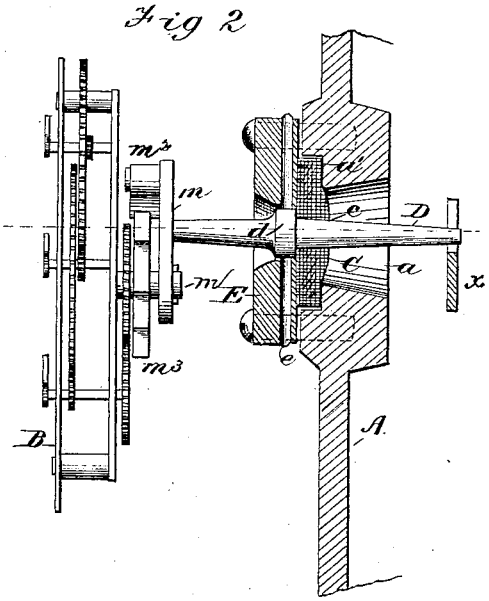
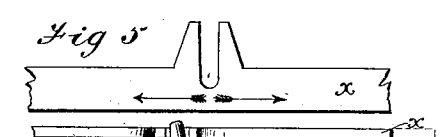
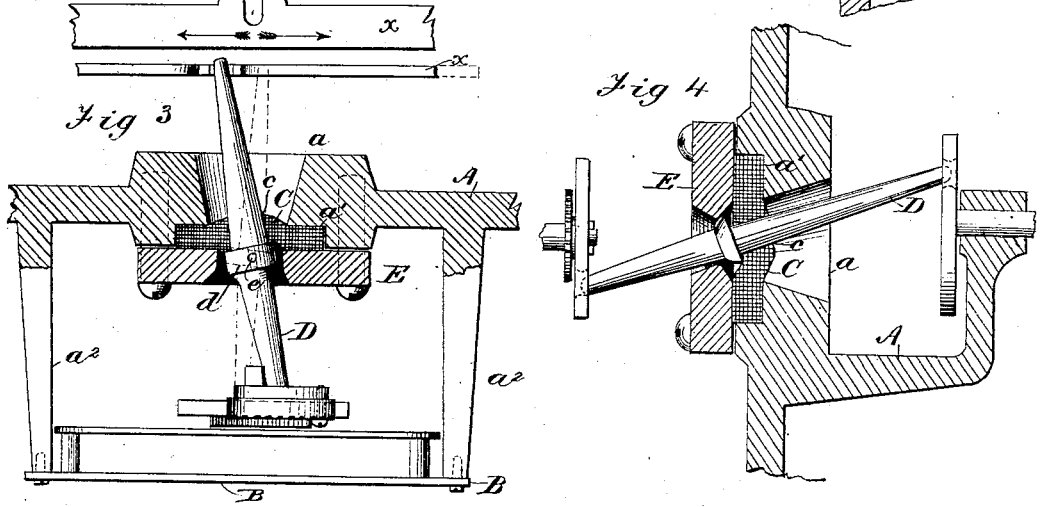
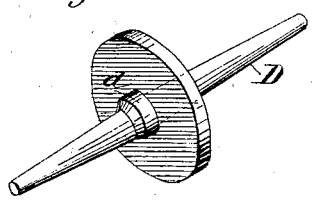
Witnesses:
Harry C. Clark
M. E. Stallings
Inventor,
Chas. E. Lipe
by H. W. Beadle & Co.
his Attys

UNITED STATES PATENT OFFICE.

CHARLES E. LIPE, OF ILION, NEW YORK.

IMPROVEMENT IN FLUID-METERS.

Specification forming part of Letters Patent No. 194,523, dated August 28, 1877; application filed March 1, 1876.

*To all whom it may concern:*

Be it known that I, CHARLES E. LIPE, of Ilion, in the county of Herkimer and State of New York, have invented a new and useful Improvement in Fluid-Meters; and I do hereby declare that the following is a full and exact description of the same, reference being had to the accompanying drawings, and to the letters of reference marked thereon.

This invention consists in the employment, between the measuring mechanism of a fluid-meter and its indicating mechanism, of certain intermediate connecting mechanism for properly communicating the movements of the former to the latter, the same consisting, essentially, in the combination of a lever and elastic packing with the shell or case of the meter, as will be fully described hereinafter.

In the drawings, Figure 1 represents a face view of a dial or indicating mechanism, partially broken away to show the actuating mechanism behind it; Fig. 2, a transverse vertical sectional elevation, showing my improvement as employed to communicate the movements of the meter to the indicating mechanism; Fig. 3, a transverse horizontal section of the same; Fig. 4, a modified form; Fig. 5, a side elevation of the actuating mechanism of the meter; and Fig. 6, a perspective view of the intermediate connecting-lever and the elastic packing attached thereto.

To enable others skilled in the art to make and use my invention, I will now proceed to describe fully its construction and manner of operation.

A represents the shell or case of the meter, which may be, of course, constructed in any proper manner and be adapted for measuring any kind of fluid. $a$ represents a suitable opening in any one of its sides, and $a^1$ a recess located about the mouth of the opening, as shown. B represents the indicating or dial mechanism, of any approved construction, which may be supported upon lugs $a^2$ $a^2$, projecting from the sides of the meter, as shown in Fig. 3. C represents an elastic washer or packing-disk, adapted to rest in the recess $a^1$ of the casing and cover the opening $a$, which is provided with a central opening, $c$, of suitable size, as shown. D represents a connecting-lever of suitable length, which is provided near its center with a shoulder, $d$, having a flat face, adapted to rest against the washer, as shown. E represents a gland, consisting of a suitable metal disk provided with proper screw-holes, by means of which it may be secured to the shell of the meter, and having also a central opening to permit the protrusion of one end of the lever, as shown.

This opening may be contracted near its center, so as to resemble in outline the form of an hour-glass, as shown in Fig. 4, for the purpose of holding the shoulder of the lever and preventing the latter from moving in a longitudinal direction.

By means of this peculiarity of form the inner enlargement of the opening is adapted to furnish a proper bearing-surface for the shoulder, and the outer enlargement to furnish sufficient space for its free movement.

If desired, however, the lever may be secured to the gland by a transverse pin or shaft, $e$, as shown in Figs. 2 and 3, in which case this special form of opening is not required.

The operation is as follows: The inner end of the lever is attached in any suitable manner to some proper moving part of the measuring mechanism. If this has a reciprocating movement, as represented by the bar $x$, Figs. 3 and 5, the lever is secured by the pin or shaft, as shown, and consequently when actuated it simply vibrates upon this pivot. Its outer end then may be caused to engage with any suitable mechanism for actuating the dials, that being preferred which is shown in Figs. 1 and 2. This consists of an arm, $m$, pivoted to a stud, $m^1$, which arm carries a pawl, $m^2$, moving a ratchet-wheel, $m^3$, connected in any suitable manner with the dial mechanism.

If the attachment-point of the measuring mechanism has a revolving movement, as shown in Fig. 4, then the inner end of the lever is loosely connected thereto. In consequence of this construction it is, when actuated, caused to rock upon its central support in such manner as to describe a circle with its outer end, which latter may be connected to dial mechanism in any suitable manner.

Some of the advantages of the described construction are as follows: By means of the construction described the movements of the interior measuring mechanism are accurately communicated to the exterior indicating or dial mechanism without danger of the escape of fluid through the communicating opening.

The elastic packing is compressed upon one side by the gland and on the other by the pressure of the fluid in the meter, so that a tight joint is made, which, however, possesses sufficient flexibility to permit the lever to make readily its necessary movements, which, of course, are small at the pivot-point.

Having thus fully described my invention, what I claim as new, and desire to secure by Letters Patent, is—

1. In combination with the casing A, the lever D, and the transverse pin $e$, the gland E and the elastic packing C, as described.

2. In combination with the recessed casing A, the gland E, and the elastic packing C, the lever D, as described.

This specification signed and witnessed this 24th day of February, 1876.

CHAS. E. LIPE.

Witnesses:
G. L. EDICK,
H. B. HART.